US006322093B1

(12) United States Patent
Athans et al.

(10) Patent No.: US 6,322,093 B1
(45) Date of Patent: *Nov. 27, 2001

(54) DOUBLE SHEAR TRAILER BEARING PLATE FOR FIFTH WHEEL

(75) Inventors: Leonidas C. Athans, Crystal Lake; George C. Athans, Lake In The Hills, both of IL (US)

(73) Assignee: Direct Dimensions Inc., Lake In The Hills, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/360,552

(22) Filed: Jul. 26, 1999

(51) Int. Cl.$^7$ ................................................ B62D 53/06
(52) U.S. Cl. ............................................ 280/433; 280/504
(58) Field of Search .................................. 280/433, 435, 280/423.1, 495, 496, 504, 509, 499

(56) References Cited

U.S. PATENT DOCUMENTS

| 481,655 | * | 8/1892 | Olsen . | |
|---|---|---|---|---|
| 2,503,530 | * | 4/1950 | Weber | 308/221 |
| 2,508,610 | * | 5/1950 | Kendall | 280/125 |
| 2,662,799 | * | 12/1953 | Schaefer | 280/433 |
| 2,665,177 | * | 1/1954 | Schaefer | 308/136 |
| 2,958,541 | * | 11/1960 | Bär | 280/433 |
| 3,091,501 | * | 5/1963 | Satrum | 308/222 |
| 3,174,812 | * | 3/1965 | Widmer | 308/136 |
| 3,275,390 | * | 9/1966 | Franks | 384/421 |
| 3,337,277 | * | 8/1967 | Arnold | 308/136 |
| 3,511,523 | * | 5/1970 | Fuller | 280/433 |
| 3,622,173 | * | 11/1971 | Hodgson | 280/125 |
| 3,704,924 | * | 12/1972 | Lowry | 308/136 |
| 3,887,251 | * | 6/1975 | McKay | 308/136 |
| 3,924,909 | * | 12/1975 | Kent et al. | 308/136 |
| 4,121,853 | * | 10/1978 | McKay | 280/433 |
| 4,457,531 | * | 7/1984 | Hünger | 280/433 |
| 4,805,926 | * | 2/1989 | Mamery | 280/433 |
| 4,841,872 | * | 6/1989 | Wicks et al. | 280/408 |
| 4,946,184 | * | 8/1990 | Larocco | 280/433 |
| 5,066,035 | * | 11/1991 | Athans et al. | 280/441.1 |
| 5,411,281 | * | 5/1995 | Poirier | 280/433 |

FOREIGN PATENT DOCUMENTS

| 1037871 | | 8/1958 | (DE) . | |
|---|---|---|---|---|
| 2934748 | * | 3/1980 | (DE) | 280/433 |
| 3833910 | * | 4/1989 | (DE) | 280/433 |

OTHER PUBLICATIONS

Advertising brochure of Canada Polymeric Inc. for Polyglide Fifth Wheel Plate.

Advertising brochure for Holland's 3500 LowLube Fifth Wheels.

Advertising brochure for Revolver Greaseless Coupling System.

Advertising brochure of American Made, Inc. for the 5$^{th}$ Wheel Interface Lubricant.

* cited by examiner

Primary Examiner—Kenneth R. Rice
Assistant Examiner—Michael Cuff
(74) Attorney, Agent, or Firm—Wallenstein & Wagner, Ltd.

(57) ABSTRACT

An assembly for coupling a truck tractor to a semi-trailer. The assembly comprises an upper coupling plate, an intermediate plate, and a back plate. The upper coupling plate has an opening for receiving the kingpin. The intermediate plate is positioned on an upper surface of the upper coupling plate and has a portal for receiving a portion of the kingpin. The back plate is positioned adjacent the intermediate plate. A double shear attachment means joins the upper coupling plate, the intermediate plate, and the back plate are along a first shear plane and a second shear plane.

11 Claims, 2 Drawing Sheets

DOUBLE SHEAR TRAILER BEARING PLATE FOR FIFTH WHEEL

DESCRIPTION

TECHNICAL FIELD

The present invention relates generally to a fifth wheel assembly for coupling an over-the-road truck tractor to a semi-trailer, and more particularly to an improved double shear kingpin attachment means for anchoring a kingpin to a trailer beraing plate.

BACKGROUND OF THE INVENTION

Conventionally, truck tractors have been coupled to a semi-trailer by a coupling device commonly referred to as a "fifth wheel". Accordingly, the truck tractor has a "fifth wheel" comprising a substantially round flat plate positioned in a substantially horizontal plane to form a tractor bearing surface. The semi-trailer includes a kingpin extending downwardly to locate and seat with the locking mechanism in the fifth wheel of the tractor. The trailer further includes a trailer bearing surface to match the tractor bearing surface. Once coupled, the tractor and trailer can pivot about the kingpin to permit the truck and trailer to articulate when turning. Because the tractor bearing plate necessarily bears a large portion of the trailer weight, much friction between the two bearing surfaces is developed. This friction adversely affects vehicle handling, increases tire wear, fatigues the driver, impairs safety and causes premature wear and damage to the truck and trailer chassis and their related components.

To reduce this friction, a lubricant such as grease has been placed between the truck tractor and semi-trailer upper coupler assembly. However, it is difficult to maintain a satisfactory layer of grease between the two bearing surfaces, thus requiring the grease to be often replenished. In addition, grease is environmentally unfriendly and very messy, attracts dirt and falls from the tractor to the road surface, thus becoming a hazard to vehicles. Further, as the grease dissipates, the handling and performance characteristics of the truck tractor and semi-trailer deteriorate such that oversteer is experienced creating an unsafe condition.

To eliminate the need for a layer of grease, ball and roller bearings have been utilized to permit the tractor bearing surface itself to rotate. However such coupling devices are relatively complex, expensive, heavy, difficult to maintain and commercially unacceptable.

Additionally, when pulling an empty trailer, especially one of today's lightweight aluminum trailers, the trailer bearing surface tends to bounce on the tractor bearing surface. This vibration is transmitted into the tractor cab, further adding to the fatigue and discomfort of the driver. Likewise, metal fatigue to the truck tractor and semi-trailer increases.

The friction also leads to wear on the kingpin. While other components of the trailer bearing are lubricated, the kingpin experiences wear from the pulling and turning by the tractor. The kingpin is often difficult to replace because it is welded in place or bolts which hold the kingpin in place are difficult or impossible to reach.

Furthermore, pulling, turning, and changing directions exert a great deal of force on the trailer bearing. Under the force of the loaded trailer and the tractor, the trailer bearing will often fail. This could lead to lost loads and accidents.

Most methods of producing the trailer bearing plate consist of a series of plates and attachments methods such as welds, bolts, or rivets. For instance, U.S. Pat. No. 2,665,177 to Schaefer is directed toward a trailer bearing. The trailer bearing comprises a lubricant retainer. The kingpin is riveted to an upper plate. U.S. Pat. No. 2,958,541 to Bar describes a replaceable kingpin mounting. The mounting comprises a pair of plates and a plurality of bolts. One plate has an opening for accepting the kingpin. The second plate has a recess for accepting the kingpin. The plates are welded together, and the bolts hold the kingpin to the second plate. U.S. Pat. No. 5,411,281 to Poirier is directed to a trailer bearing comprising a rotatable kingpin. The kingpin is mounted within a housing to allow rotation.

The present invention is provided to solve the problems stated herein as well as other problems.

SUMMARY OF THE INVENTION

In accordance with the invention, a novel trailer plate assembly for semi-trailers has been developed for a truck tractor fifth wheel. The trailer bearing plate assembly includes a housing adapted to be securely attach to an underside of a trailer. The trailer bearing plate assembly further includes a plurality of spaced reinforcement beams. The reinforcement beams extend between a first pair of opposing end walls. Each reinforcement beam is attached at either end to the first pair of opposing end walls and an upper surface of an upper coupling plate portion of the housing.

A pair of spaced longitudinal supports extend between the reinforcement beams. The longitudinal supports are fixedly attached at their ends to the reinforcement beams and along their length to the upper coupling plate. In combination, the arrangement of the longitudinal supports and the reinforcement beams form a sub-housing for receiving a double shear plane attachment means for connecting a kingpin to the housing.

The double shear attachment means comprises a back plate, an intermediate, receiver, or reinforcement plate, and a plurality of pins working in combination with the upper coupling plate and the kingpin to fixedly secure the kingpin within the sub-housing.

A conventional kingpin passes through an opening in the upper coupling plate. The kingpin includes a flanged portion positioned against the upper surface of the upper coupling plate. The flanged portion includes a plurality of radial bolt holes. The upper coupling plate has an equal number of countersunk locking holes. When positioned correctly, the radial bolt holes of the flange are aligned with the countersunk locking holes the upper coupling plate.

The receiver plate is positioned within the sub-housing in communication with the upper surface of the upper coupling plate. The receiver plate includes a portal for receiving the flanged portion of the kingpin. The receiver plate further includes a plurality of first threaded pin receivers.

The back plate is positioned within the sub-housing in communication with the receiver plate. The back plate includes a plurality of radial apertures. When positioned properly, the radial apertures are aligned with the radial bolt holes of the flange and the countersunk locking holes of the upper coupling plate. A set of countersunk head bolts of sufficient length to pass through the countersunk locking holes in the upper coupling plate, the radial bolt holes in the flange, and radial apertures of the back plate along with a corresponding number of nuts anchor the back plate with the kingpin and the upper coupling plate.

The back plate also includes a plurality of second threaded pin receivers. The second threaded pin receivers are aligned with the first threaded pin receivers of the receiver plate. Threaded bolts fixedly attach the back plate to the receiver plate.

The present invention may be retro-fitted to any existing semi-trailer or provided as an original equipment feature. Other features and advantages of the invention will be apparent from the following specification taken in conjunction with the following drawings.

DETAILED DESCRIPTION

Figure 1:
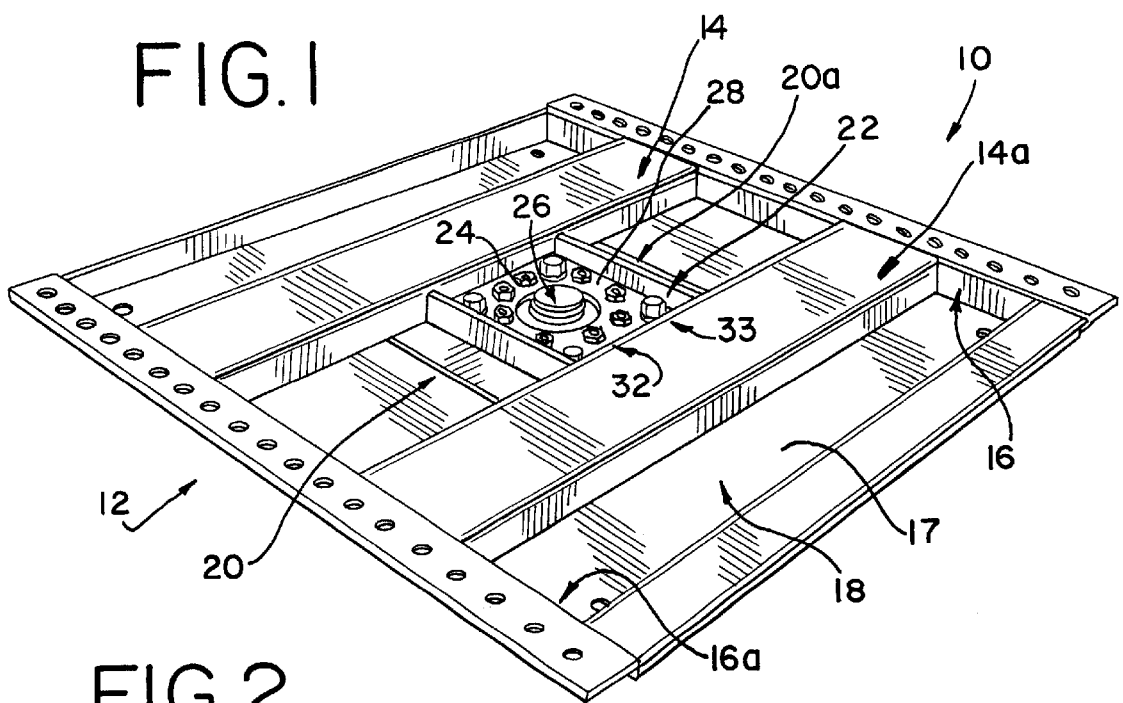
FIG. 1 is a perspective view of a trailer plate assembly for coupling a truck tractor to a semi-trailer incorporating the present invention.
Figure 2:
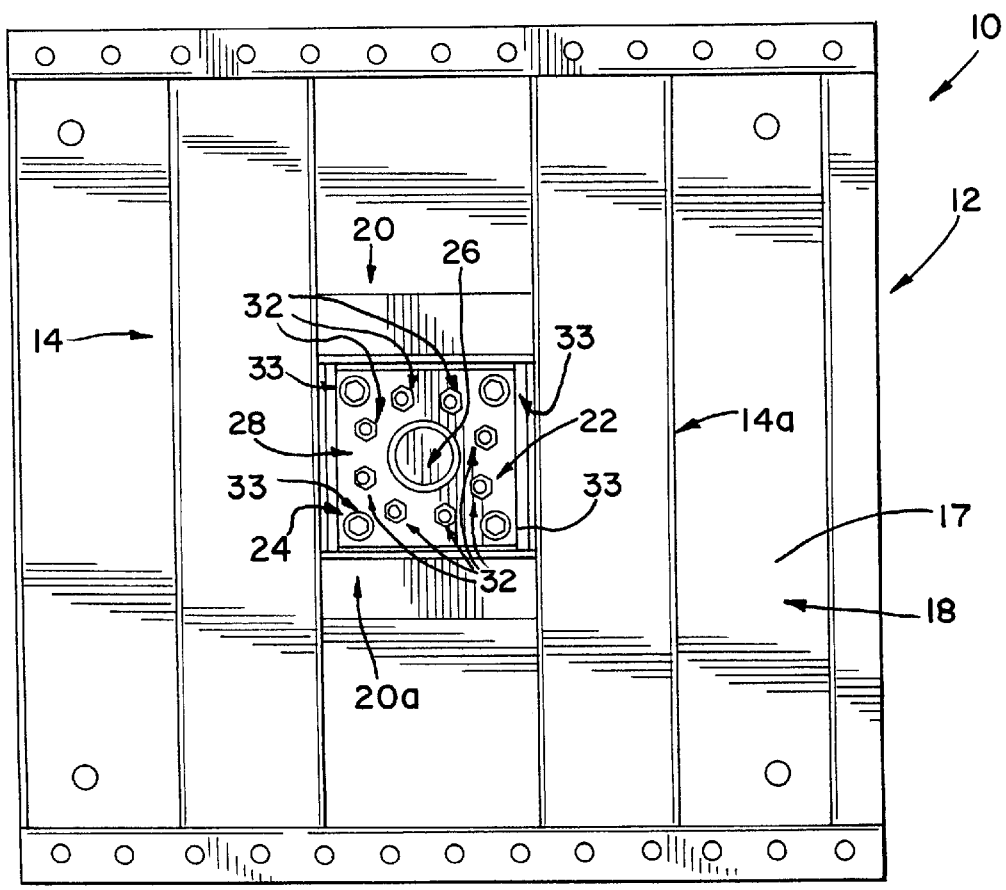
FIG. 2 is a top view of the trailer plate.

While this invention is susceptible of embodiments in many different forms, there is shown in the drawings and will herein be described in detail, preferred embodiments of the invention with the understanding that the present disclosure is to be considered as exemplifications of the principles of the invention and is not intended to limit the broad aspects of the invention to the particular embodiments illustrated.

A trailer bearing plate assembly 10 is illustrated in FIG. 1. The trailer bearing plate assembly 10 includes a housing 12 adapted to be securely attach to an underside of a trailer. The trailer bearing plate assembly 10 can be attached by welding, bolting, or any other suitable attachment means. The trailer bearing plate assembly 10 further includes a plurality of spaced reinforcement beams 14, 14a. The reinforcement beams 14, 14a extend between a first pair of opposing end walls 16, 16a. Each reinforcement beam 14, 14a is attached at either end to the first pair of opposing end walls 16, 16a and an upper surface 17 of an upper coupling plate portion 18 of the housing 12.

A pair of spaced longitudinal supports 20, 20a extend between the reinforcement beams 14, 14a. The longitudinal supports 20, 20a are fixedly attached at their ends to the reinforcement beams 14, 14a and along their length to the upper coupling plate 18. In combination, the arrangement of the longitudinal supports 20, 20a and the reinforcement beams 14, 14a form a sub-housing 22 for receiving a double shear plane attachment means 24 for connecting a kingpin 26 to the housing 12.

Figure 3:
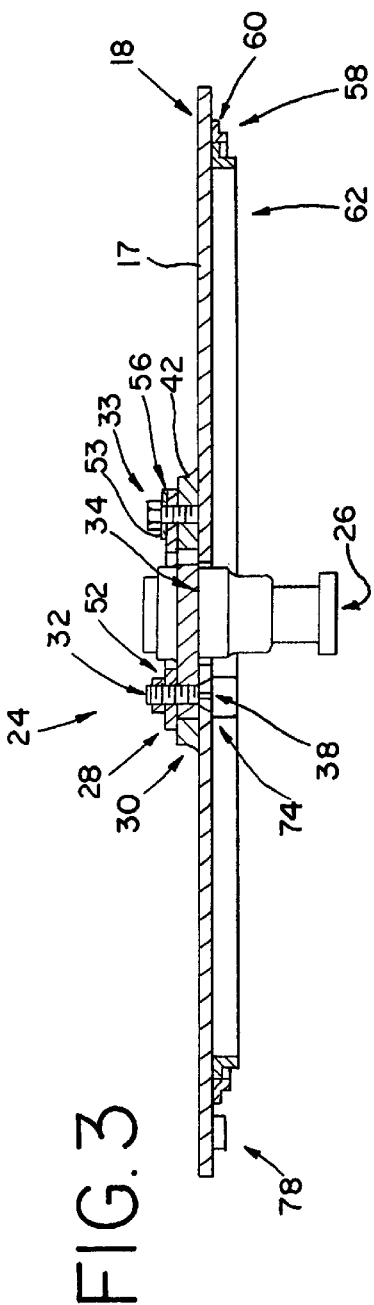
FIG. 3 is a partial cross-sectional view of the trailer plate of the present invention.
Figure 4:
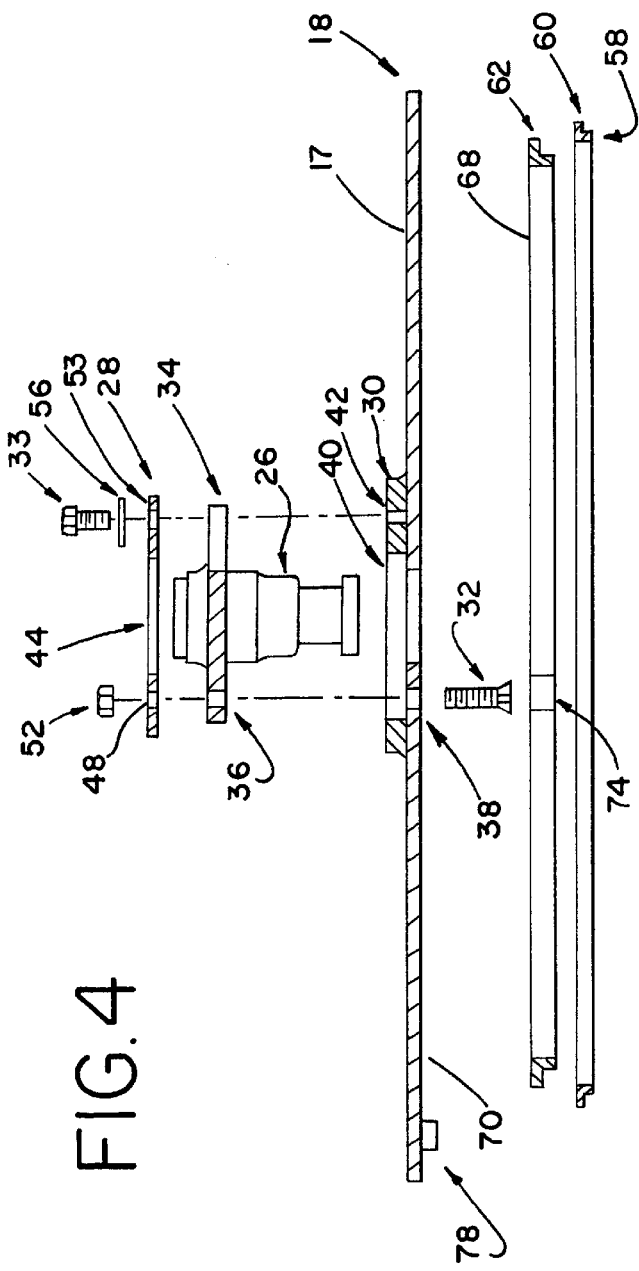
FIG. 4 is an exploded, partial cross-sectional view of the trailer plate of the present invention.

Referring to FIGS. 3 and 4, the double shear attachment means 24 comprises a back plate 28, an intermediate, receiver, or reinforcement plate 30, and a plurality of countersunk head bolts 32 and conventional bolts 33 working in combination with the upper coupling plate portion 18 of the housing 12 and the kingpin 26 to fixedly secure the kingpin 26 within the sub-housing 22. The double shear attachment means 24 is particularly effective in anchoring the kingpin 26 to the housing 12 under the large forces that the kingpin 26 experiences when the tractor is hauling very large loads. The double shear attachment means 24 also withstands the large forces associated with abrupt changes in direction. At the same time, the double shear attachment means 24 allows the kingpin 26, which is more susceptible to wear than other components of the housing 12, to be replaced with relative ease.

A conventional kingpin 26 passes through an opening 30 in the upper coupling plate 18. The kingpin 26 includes a flanged portion 34 positioned against the upper surface 17 of the upper coupling plate 18. The flanged portion 34 includes a plurality of radial bolt holes 36. The upper coupling plate 18 has an equal number of countersunk locking holes 38. When positioned correctly the radial bolt holes 36 of the flange 34 are aligned with the countersunk locking holes 38 in the upper coupling plate 18.

The receiver plate 30 is positioned within the sub-housing 22 in communication with the upper surface 17 of the upper coupling plate 18. The receiver plate 30 is fixedly attached to the upper surface 17 of the upper coupling plate 18 by welding or other suitable attachment means. The receiver plate 30 is generally produced from steel plate and includes a portal 40 for receiving the flanged portion 34 of the kingpin 26. The receiver plate 30 further includes a plurality of first threaded pin receivers 42 the purpose of which will become clear upon further description.

The back plate 28 is generally produce from steel plate and is positioned within the sub-housing 22 in communication with the receiver plate 30. The back plate 28 includes a large opening 44 for receiving a distal end 46 of the kingpin 26. The back plate 28 further includes a plurality of radial apertures 48. When positioned properly, the radial apertures 48 are aligned with the radial bolt holes 36 of the flange 34 and the countersunk locking holes 38 of the upper coupling plate 18. A set of countersunk head bolts 33 of sufficient length to pass through the countersunk locking holes 38 in the upper coupling plate 18, the radial bolt holes 36 in the flange 34, and radial apertures 48 of the back plate 28 along with a corresponding number of nuts 52 anchor the back plate 28 with the kingpin 26 and the upper coupling plate 18, thus creating a first shear plane.

The back plate 28 also includes a plurality of second threaded pin receivers 53. The second threaded pin receivers 53 are aligned with the first threaded pin receivers 42 of the receiver plate 30. A corresponding number of conventional threaded bolts 33 and washers 56 are provided. The threaded bolts 33 fixedly attach the back plate 28 to the receiver plate 30 but not with the flange 34 or coupling plate 18, thus creating a second shear plane.

The trailer bearing plate assembly 10 further comprises a retaining ring 58 having a collar 60. The ring 58 is securely attached to the housing 12 by welding or other suitable attachment means. The trailer bearing plate assembly 10 further includes a disk 62 disposed between the collar 60 and the coupling plate 18.

The disk 62 includes a perimeter surface 64 terminating with a chamfer 66. An upper surface 68 of the disk 62 has a precision surface finish on the order of about 250 microns. This facilitates the holding of a lubricant layer and rotation of the disk 62 on an outer surface 70 of the upper coupling plate 18. The disk 62 is preferably formed from an ultra-high molecular weight polyethylene plastic such as Tivar® or it may be formed from steel. A Tivar® disk having a thickness of the order of 1.5" has been found to work satisfactorily. The disk 62 includes a centrally located hole 72 to permit the kingpin 26 to extend therethrough. The disk 62 is secured to the housing 12 by the collar 60 as illustrated in FIG. 3.

In one embodiment, the outer surface 70 of the upper coupling plate 18 and the disk 62 are spaced, providing a gap therebetween. The gap is on the order of about 0.125" thick. The gap is filled with a lubricant, such as white lithium grease. Grease fittings 74 are provided in the disk 62 to permit re-filling of any grease which is lost. The grease fittings 74 are also aligned with the countersunk locking holes 38 to allow easy access to the countersunk head bolts 50 and thus, allowing for replacement of worn kingpins 26.

According to another embodiment, the disk 62 is in direct contact with the outer surface 70 and the gap is essentially eliminated. The collar 60 cooperates with the chamfer 66 of the disk 62 to form a seal to substantially retain the grease within the gap. The seal also minimizes degradation of the grease by keeping out dirt and other contaminants. A formable silicone gasket may be used to further seal the grease within the gap. The disk 62 effectively "floats" or is hydraulically supported by the veneer of grease within the gap. As a result, when the a tractor turns relative to a trailer, disk 62 does not rotate relative to the tractor bearing plate assembly 10. Rather, the disk 62 rotates on the grease within the gap. As a result, little or no abrasion results between the disk 62 and the tractor's bearing plate.

Additionally, the grease-filled gaps results in a marked reduction in cab noise and vibration when hauling an empty trailer. It is believed that this cab noise reduction is the result of the layer of grease isolating trailer vibrations and where disk 62 is formed from plastic. This minimizes noise and vibration transmission into the truck tractor cab.

According to another embodiment of the invention, the disk 62 is formed from a high molecular weight polyethylene plastic such as Tivar®. Disk 62 has an upper disk surface 68 in substantially continuous contact with the outer surface 70 of the upper coupling plate 18 thus effectively eliminating the gap.

In yet another embodiment, to protect the disk 62 from premature peeling during coupling with a tractor's fifth wheel, a front bar 78 is mounted to the outer surface 70 of the upper coupling plate 18. The front bar 78 is generally produced from steel rod and is welded directly to the outer surface 70 of the upper coupling plate 18. The front bar 78 acts as a barrier between the disk 62 and the tractor's fifth wheel. With this arrangement, the tractor's fifth wheel contacts the front bar 78 prior to contacting the disk 62. Thus, the front bar 78 prevents the tractor's fifth wheel from "grabbing" or peeling the leading edge of the disk 62 from the outer surface 70 of the upper coupling plate 18.

It will be understood that the invention may be embodied in other specific forms without departing from the spirit or central characteristics thereof the present examples and embodiments, therefore, are to be considered in all respects as illustrative and not restrictive, and the invention is not to be limited to the details given herein.

We claim:

1. An assembly for coupling a truck tractor to a semi-trailer, the assembly comprising:
   a kingpin having a flange portion;
   an upper coupling plate having an opening for receiving the kingpin;
   an intermediate plate having a portion for receiving the flange portion of the kingpin;
   a back plate overlapping a portion of the intermediate plate; and,
   an attachment means for joining the upper coupling plate, the intermediate plate, and the back plate along a first shear plane and a second shear plane wherein the back plate is removably attached to the overlapped portion of the intermediate plate and to the flange portion of the kingpin and the upper coupling plate.

2. The assembly of claim 1 wherein the attachment means comprises a plurality of attachment pins of a first length joining the coupling plate with the kingpin and the back plate and a plurality of attachment pins of a second length joining the back plate with the intermediate plate.

3. The assembly of claim 1 wherein the upper coupling plate includes a sub-housing located on an upper surface, the attachment means being positioned within the sub-housing.

4. The assembly of claim 1 wherein the upper coupling plate has an upper surface and a plurality of parallel reinforcement beams positioned along the upper surface.

5. The assembly of claim 4 wherein the upper coupling plate includes a plurality of parallel longitudinal supports substantially perpendicular to the reinforcement beams, a sub-housing being formed between the reinforcement beams and the longitudinal supports.

6. The assembly of claim 5 wherein the attachment means is positioned within the sub-housing.

7. The assembly of claim 1 wherein the upper coupling plate has a plurality of countersunk locking holes, the flange portion of the kingpin has a plurality of radial bolt holes, the radial bolt holes being aligned with the locking holes in the upper coupling plate, the intermediate plate is fixedly attached the upper coupling plate, the intermediate plate having a portal for receiving the flanged portion of the kingpin and a plurality of first pin receivers, the back plate having a plurality of second pin receivers aligned with the first pin receivers of the intermediate plate, wherein a plurality of attachment pins of a first length join the upper coupling plate with the flange portion of the kingpin and the back plate, and a plurality of attachment pins of a second length join the back plate with the intermediate plate.

8. The assembly of claim 1 further comprising a ring fixedly attached to an outer surface of the upper coupling plate, the ring having a collar and adapted to securely the upper coupling plate, and further including a disk disposed between the collar and said upper coupling plate.

9. The assembly of claim 8 including a layer of grease disposed between the disk and the upper coupling plate.

10. The assembly of claim 8 wherein the disk includes a grease fitting for permitting introduction of grease between the disk and the upper coupling plate.

11. An assembly for coupling a truck tractor to a semi-trailer, the assembly comprising:
    a housing having first and second pairs of parallel end walls spaced by an upper coupling plate having an opening and a plurality of countersunk locking holes, a plurality of reinforcement beams extending between the first pair of parallel end walls, and a pair of longitudinal supports between the reinforcement beams forming a sub-housing;
    a kingpin positioned within the sub-housing and having a portion which passes through an opening in the upper coupling plate, the kingpin having a flange portion having a plurality of radial bolt holes, the radial bolt holes being aligned with the locking holes in the upper coupling plate;
    an intermediate plate positioned within the sub-housing and fixedly attached the upper coupling plate, the intermediate plate having a portal for receiving the flanged portion of the kingpin and a plurality of first pin receivers;
    a back plate positioned within the sub-housing having a plurality of second pin receivers aligned with the first pin receivers of the intermediate plate;
    a plurality of attachment pins of a first length joining the upper coupling plate with the flange portion of the kingpin and the back plate; and
    a plurality of attachment pins of a second length joining the back plate with the intermediate plate.

* * * * *